United States Patent
Miyoshi

(10) Patent No.: US 10,679,327 B2
(45) Date of Patent: Jun. 9, 2020

(54) IMAGE BLUR CORRECTION DEVICE, IMAGING DEVICE, AND OPTICAL DEVICE

(71) Applicant: CANON KABUSHIKI KAISHA, Tokyo (JP)

(72) Inventor: Kaori Miyoshi, Fuchu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/155,096

(22) Filed: Oct. 9, 2018

(65) Prior Publication Data
US 2019/0108624 A1   Apr. 11, 2019

(30) Foreign Application Priority Data
Oct. 10, 2017 (JP) ................ 2017-197015

(51) Int. Cl.
| | | |
|---|---|---|
| *G06T 5/00* | (2006.01) | |
| *H04N 5/232* | (2006.01) | |
| *G02B 7/10* | (2006.01) | |
| *H04N 5/225* | (2006.01) | |

(52) U.S. Cl.
CPC .............. *G06T 5/003* (2013.01); *G02B 7/10* (2013.01); *H04N 5/2254* (2013.01); *H04N 5/23287* (2013.01); *G06T 2207/20201* (2013.01)

(58) Field of Classification Search
CPC . G02B 7/10; G06T 2207/20201; G06T 5/003; H04N 5/23287
See application file for complete search history.

(56) References Cited

U.S. PATENT DOCUMENTS

| | | | | | |
|---|---|---|---|---|---|
| 5,844,719 | A | * | 12/1998 | Wada ................... | G02B 27/646 359/557 |
| 6,064,827 | A | * | 5/2000 | Toyoda ................ | G02B 27/646 396/55 |
| 6,631,042 | B2 | * | 10/2003 | Noguchi .............. | G02B 27/646 348/E5.046 |
| 7,529,476 | B2 | * | 5/2009 | Kurosawa .......... | H04N 5/23248 348/208.7 |
| 7,548,257 | B2 | * | 6/2009 | Ito ........................ | G02B 27/646 348/208.11 |
| 8,059,158 | B2 | * | 11/2011 | Shirono ................... | G03B 5/00 348/208.4 |
| 8,139,291 | B2 | * | 3/2012 | Nakamura ........... | G02B 27/648 348/208.11 |

(Continued)

FOREIGN PATENT DOCUMENTS

| | | |
|---|---|---|
| JP | 2001290184 A | 10/2001 |
| JP | 2009092705 A | 4/2009 |

*Primary Examiner* — Amy R Hsu
(74) *Attorney, Agent, or Firm* — Venable LLP

(57) ABSTRACT

An image blur correction device includes a base member and a lens holder. The lens holder holds a correction lens and is supported by a rolling ball to be capable of movement to the base member. The base member has a receiving part of the rolling ball and the lens holder has a restricting part of the rolling ball. The restricting part has a concave shape deeper than the diameter of the rolling ball, and a first ball receiving surface part is provided in the concave part. A second ball receiving surface part is provided in the receiving part that faces the restricting part and enters the concave part and the rolling ball is interposed between the first ball receiving surface part and the second ball receiving surface part.

18 Claims, 7 Drawing Sheets

(56) References Cited

U.S. PATENT DOCUMENTS

| | | | |
|---|---|---|---|
| 2006/0055787 A1* | 3/2006 | Hirota | G03B 5/00 348/208.5 |
| 2006/0056829 A1* | 3/2006 | Hirota | G03B 5/00 396/54 |
| 2012/0188441 A1* | 7/2012 | Takizawa | H04N 5/2251 348/374 |

* cited by examiner

IMAGE BLUR CORRECTION DEVICE, IMAGING DEVICE, AND OPTICAL DEVICE

BACKGROUND OF THE INVENTION

Field of the Invention

The present invention relates to a technology for correcting image blur of an image due to hand shake or the like.

Description of the Related Art

An imaging device having an image blur correction function can reduce image blur due to hand shake that can occur during hand-held photographing. A device described in Japanese Patent Laid-Open No. 2009-92705 includes two sliders that are slidably supported along two independent guide bars fixed to a housing which is a fixing member. A movable member (lens frame) engaged with the two sliders can move within a plane perpendicular to an optical axis. A correction lens is engaged with the guide bar and there is a low likelihood of the correction lens being disengaged from the guide bar even if an impact force is applied. However, if friction between the guide bar and the slider is great, it is not possible to stably drive the lens frame. In addition, independent guide bars and sliders are necessary, the number of parts increases, and the size of a unit may increase.

In an image blur correction device disclosed in Japanese Patent Laid-Open No. 2001-290184, a correction lens which is a movable member is press-fitted to a base which is a fixing part via a rolling ball. Since the correction lens is supported according to rolling friction with respect to the fixing part, friction is very low, and stable driving can be obtained.

In the image blur correction device disclosed in Japanese Patent Laid-Open No. 2001-290184, it is not possible for the height of a restricting part that restricts a rolling ball to be set higher than a ball diameter. When the diameter of the rolling ball is reduced according to a reduction in size, the height of the restricting part is inevitably reduced. As a result, when a force pulling the movable member and the fixing member apart is applied due to a strong impact received by the image blur correction device, there is a risk of the rolling ball jumping out from the restricting part and image blur correction being not possible.

SUMMARY OF THE INVENTION

The present invention provides a structure effective in reducing the size of a device while further improving impact resistance performance in an image blur correction device configured to support an optical member using a rolling member.

An image blur correction device according to one embodiment of the present invention is an image blur correction device including a movable member which holds an optical member or an imaging element and is supported by a rolling member to be capable of relative movement to a base member and configured to correct image blur by moving the movable member, including a concave restricting part which is provided in the base member or the movable member and restricts movement of the rolling member; and a convex receiving part which is provided in the movable member or the base member and receives the rolling member, wherein the rolling member is disposed in the restricting part, the restricting part sandwiches the rolling member together with a receiving surface part provided in the receiving part in a concave part deeper than the diameter of the rolling member, and the receiving surface part enters the concave part.

According to the image blur correction device of the present invention, it is possible to provide a structure effective in reducing the size of a device while further improving impact resistance performance in an image blur correction device configured to support an optical member using a rolling member.

Further features of the present invention will become apparent from the following description of exemplary embodiments (with reference to the attached drawings).

DESCRIPTION OF THE EMBODIMENTS

Embodiments of the present invention will be described below in detail with reference to the appended drawings. Here, in the embodiments, an imaging device including an image blur correction device will be exemplified. However, the present invention can be applied to an optical device such as an interchangeable lens unit having an image blur correction function, an information processing device including an imaging unit, and the like.

First Embodiment

Figure 1:
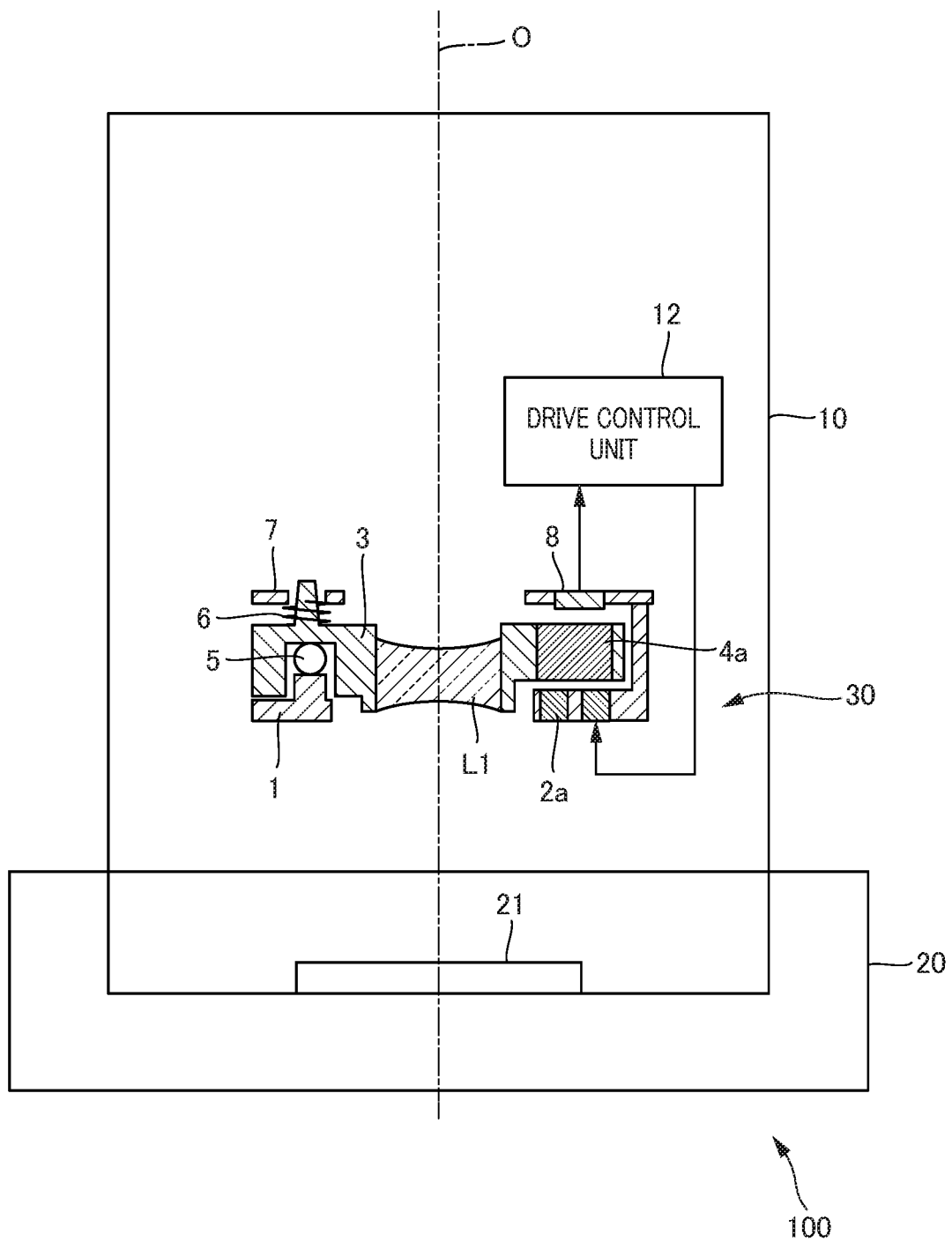
FIG. 1 is a schematic diagram illustrating a configuration example of an image blur correction device of the present embodiment.

FIG. 1 is a schematic diagram showing a configuration example of an imaging device of the present embodiment. An imaging device 100 includes a lens barrel 10 and a camera main body 20. The lens barrel 10 includes an image blur correction device 30 and a drive control unit 12. The camera main body 20 includes an imaging element 21, and photoelectrically converts an optical image of a subject formed by an imaging optical system in the lens barrel 10 and outputs an electronic signal. The imaging element 21 is an image sensor using a charge coupled device (CCD) or complementary metal oxide semiconductor (CMOS) element.

The image blur correction device 30 includes a correction lens L1, and moves the correction lens L1 within a plane perpendicular to an optical axis O of the imaging optical system according to a control command of the drive control unit 12, and thus performs image blur correction of an image. In the present embodiment, the correction lens L1 is a shift lens and functions as a correction member that corrects image shaking. Here, the lens barrel 10 includes a lens group (not shown) which constitutes the imaging optical system together with the correction lens L1.

Figure 2:
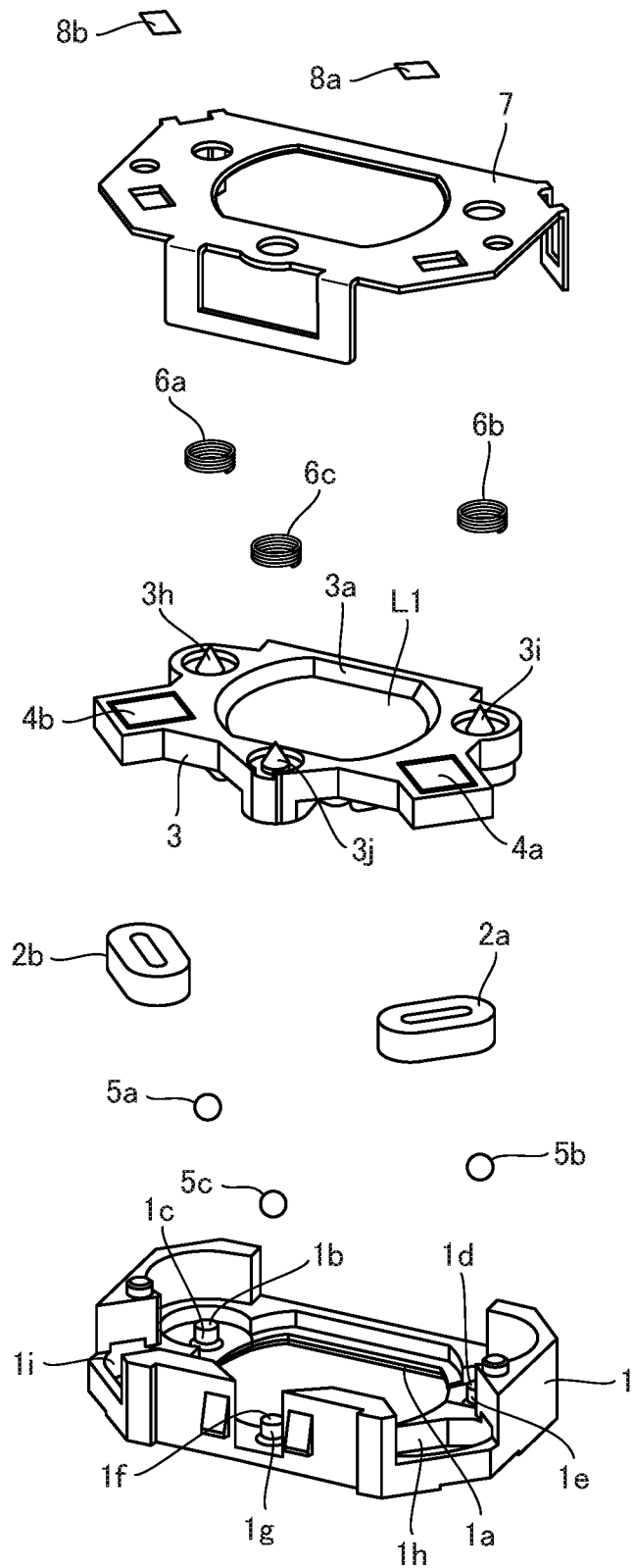
FIG. 2 is an exploded perspective view illustrating the image blur correction device of the present embodiment.
Figure 3:
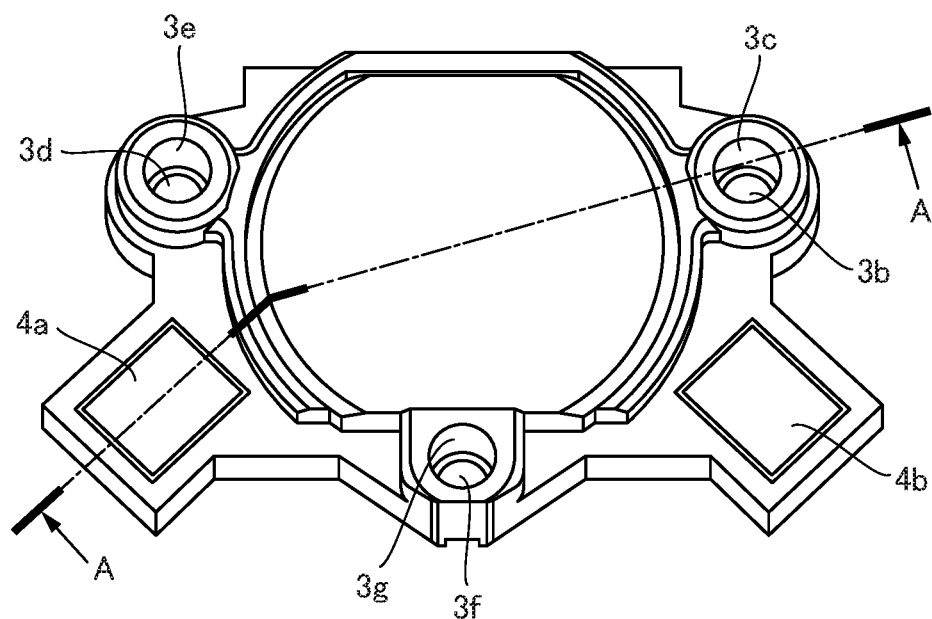
FIG. 3 is a perspective view illustrating a lens holder of the image blur correction device in FIG. 2.
Figure 4:
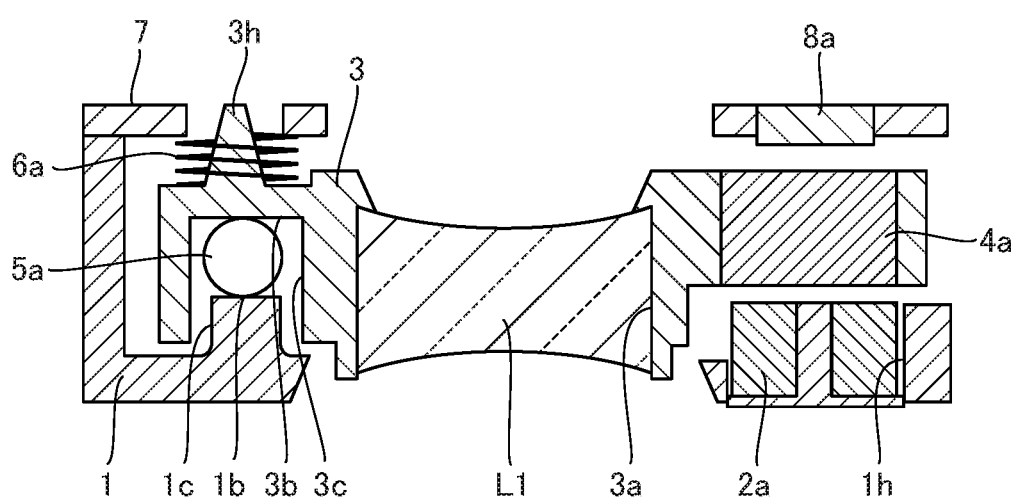
FIG. 4 is a schematic diagram illustrating a cross-sectional structure showing a main part of the image blur correction device in FIG. 2.

A configuration of the image blur correction device 30 will be described in detail with reference to FIG. 2 to FIG. 4. FIG. 2 is an exploded perspective view of the image blur correction device 30. FIG. 3 is a perspective view of a lens holder of the image blur correction device 30 when viewed in a direction opposite to that in FIG. 2. FIG. 4 is a schematic diagram showing a cross-sectional structure of a main part of the image blur correction device 30 and shows a cross section taken along the line A-A in FIG. 3. The image blur correction device 30 moves the correction lens L1 in a desired direction within a plane perpendicular to the optical axis O and corrects image blur caused by hand shake or the like. The desired direction includes directions on two axes orthogonal to the optical axis O, which will be referred to as first and second directions below.

The image blur correction device 30 (FIG. 2) includes a first drive unit and a second drive unit. The first drive unit includes a first drive coil 2a and a magnet 4a that drive the correction lens L1 in the first direction. In addition, the second drive unit includes a second drive coil 2b and a magnet 4b that drive the correction lens L1 in the second direction. The correction lens L1 is movable within a range of an upper and lower limit amount (denoted as ±S) from the initial position in the first direction and the second direction. The term "initial position" refers to a position at which the optical axis of the correction lens L1 matches an optical axis of another lens group constituting the imaging optical system. The first drive unit and the second drive unit are independently driven and controlled by the drive control unit 12.

The image blur correction device 30 includes a base member 1, the drive coils 2a and 2b, a lens holder 3 for fixing the correction lens L1 and the magnets 4a and 4b, rolling balls 5a to 5c, biasing springs 6a to 6c, a cover member 7, and Hall elements 8a and 8b.

The base member 1 has an opening 1a at the center, and the opening 1a has a role of transmitting light that has passed through the correction lens L1. Coil holding frames 1h and 1i provided in the base member 1 hold the drive coils 2a and 2b, respectively. In addition, three convex ball receiving parts for the rolling balls 5a to 5c are formed in the base member 1. The first ball receiving part is composed of a first ball receiving surface part 1b and a first abutting wall 1c which is an outer peripheral wall thereof. The second ball receiving part is composed of a second ball receiving surface part 1d and a second abutting wall 1e which is an outer peripheral wall thereof. The third ball receiving part is composed of a third ball receiving surface part 1f and a third abutting wall 1g which is an outer peripheral wall thereof.

The drive coils 2a and 2b held by the base member 1 are connected to a flexible substrate (not shown) or the like, and a current corresponding to a movement direction and an amount of movement of the correction lens L1 flows. The drive coil 2a is held by the coil holding frame 1h and the drive coil 2b is held by the coil holding frame 1i.

The lens holder 3 holds the correction lens L1 at its center part 3a. The lens holder 3 is a movable member that is relatively movable within a plane perpendicular to the optical axis O with respect to the base member 1. The magnets 4a and 4b magnetized in two poles are fixed to an outer peripheral part of the correction lens L1. The magnets 4a and 4b are disposed in a phase relationship of about 90 degrees and are in a positional relationship in which the magnet 4a faces the drive coil 2a and the magnet 4b faces the drive coil 2b.

When a current flows through the drive coils 2a and 2b due to the drive control unit 12, a magnetic force is generated. According to a relationship between this magnetic force and a magnetic force of the magnets 4a and 4b, the magnets receive a repulsive force or an attractive force. Since thrust is generated in the first direction in the magnet 4a and thrust is generated in the second direction in the magnet 4b, the lens holder 3 can be moved in a desired direction.

In the lens holder 3, three ball restricting parts having a concave part are formed (FIG. 3). The first ball restricting part is composed of a first ball receiving surface part 3b and a first restricting wall 3c which is an outer wall thereof and is in a positional relationship in which it faces the first ball receiving part of the base member 1. The second ball restricting part is composed of a second ball receiving surface part 3d and a second restricting wall 3e which is an outer wall thereof and is in a positional relationship in which it faces the second ball receiving part. The third ball restricting part is composed of a third ball receiving surface part 3f and a third restricting wall 3g which is an outer wall thereof, and is in a positional relationship in which it faces the third ball receiving part. The rolling balls 5a to 5c are inserted into the first to third ball restricting parts. The rolling ball 5a that is interposed between the ball receiving surface part 3b of the lens holder 3 and the ball receiving surface part 1b of the base member 1 can be rolled within the first ball restricting part. Similarly, the rolling ball 5b can be rolled within the second ball restricting part and the rolling ball 5c can be rolled within the third ball restricting part. Here, sizes and shapes of the first restricting wall 3c, the second restricting wall 3e, and the third restricting wall 3g will be described below in detail.

As shown in FIG. 2 and FIG. 4, the lens holder 3 includes spring holding parts 3h, 3i, and 3j. When viewed in the optical axis direction, the spring holding parts 3h, 3i, and 3j are formed at positions overlapping the first ball receiving surface part 3b, the second ball receiving surface part 3d, and the third ball receiving surface part 3f in the optical axis direction. The spring holding parts 3h, 3i, and 3j hold the biasing springs 6a, 6b, and 6c, respectively. These biasing springs are all compression springs, and are held on the side opposite to the ball receiving surface parts 3b, 3d, and 3f of the lens holder 3 in the optical axis direction. In FIG. 4, the biasing spring 6a biases the lens holder 3 downward in the drawing and a rolling ball is interposed between the lens holder 3 and the base member 1.

The cover member 7 is a member fixed to the base member 1 and holds the two Hall elements 8a and 8b (FIG. 2). The Hall element is a magnetic sensor configured to detect magnetism of a magnet. The first Hall element 8a is disposed at a position facing the first magnet 4a held by the lens holder 3 with a predetermined interval therebetween. The second Hall element 8b is disposed at a position facing the second magnet 4b held by the lens holder 3 with a predetermined interval therebetween. When the magnet 4 moves according to movement of the lens holder 3, and a change in a magnetic flux is caused, the Hall elements 8a and 8b detect this change in the first direction and the second direction. The Hall elements 8a and 8b output a detection signal to the drive control unit 12.

In an image blur correction operation, the drive control unit 12 calculates a position of the correction lens L1 based on output signals of the Hall elements 8a and 8b. The drive control unit 12 calculates a drive amount of the correction lens L1 based on the calculated position of the correction lens L1 and shake detection information acquired from a shake sensor (such as an angular velocity sensor) (not shown), and supplies a drive current to the drive coils 2a and 2b.

When imaging of the imaging device 100 starts, the drive control unit 12 moves the correction lens L1 to the initial position, and performs a centering operation such that the rolling balls 5a, 5b, and 5c are positioned approximately at the center of the ball receiving surface parts 3b, 3d, and 3f. In each of the first direction and the second direction, the drive control unit 12 moves the lens holder 3 from one end to the other end within a range of movement, detects the position at that time with the Hall elements 8a and 8b, calculates a center position from the detected position information, and thus sets the initial position. When the centering operation is performed, since a movable range of the correction lens L1 is substantially the same in all directions in the image blur correction operation during imaging, effective image blur correction is performed for any shake during imaging.

Figure 5:
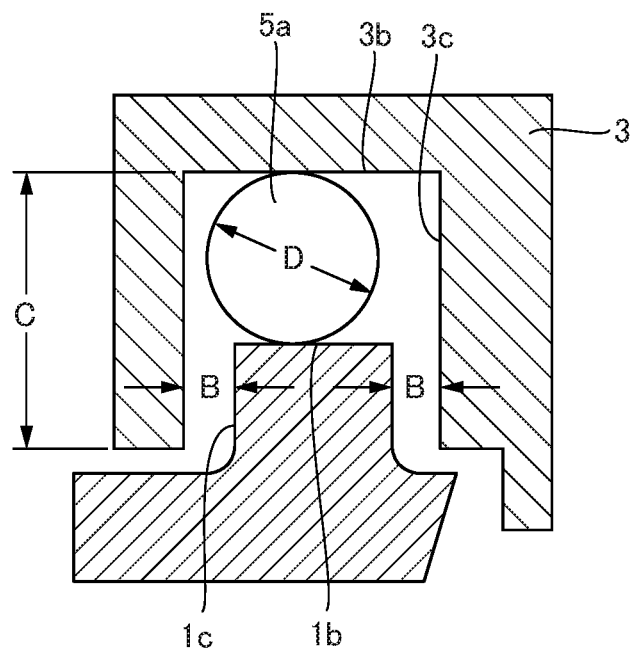
FIG. 5 is an enlarged view illustrating a rolling ball in an initial position state and parts in the vicinity thereof.
Figure 6:
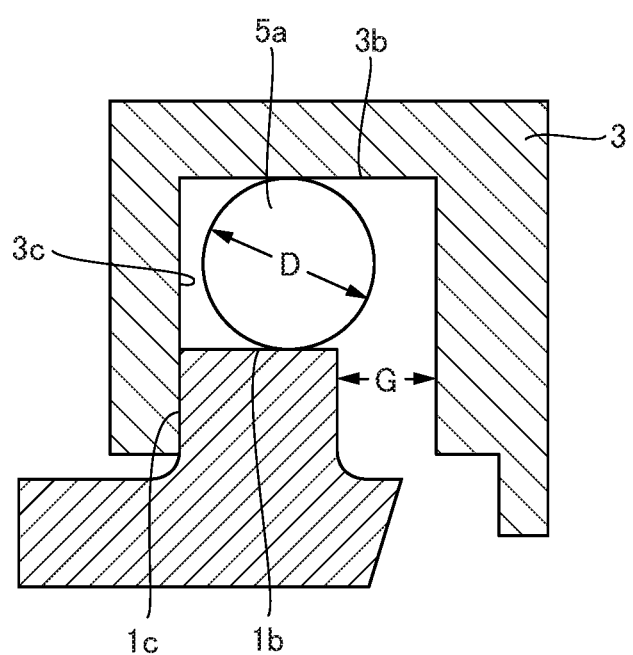
FIG. 6 is a diagram illustrating a state in which the lens holder has moved from an initial position to an end to which it can move.
Figure 7:
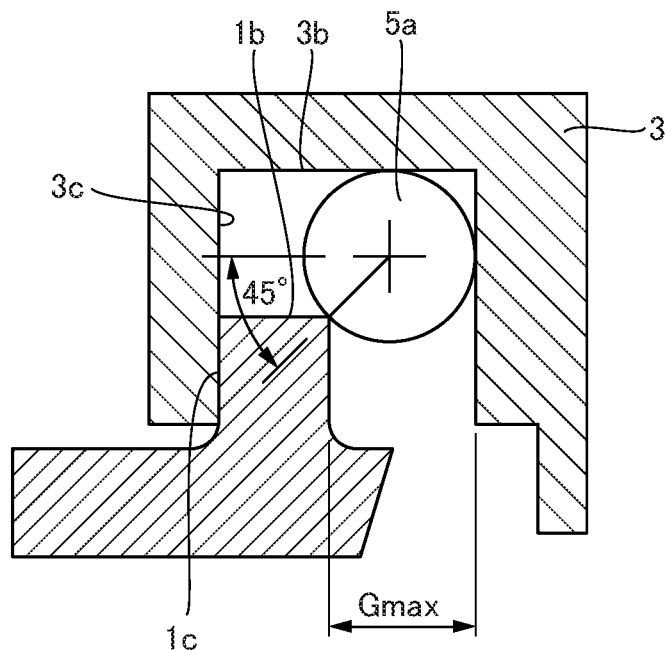
FIG. 7 is a diagram illustrating a state in which a gap between a restricting wall and an abutting wall with respect to a rolling ball is a maximum.

Next, size relationships between a ball receiving surface part and an abutting wall of the base member 1 and a ball receiving surface part and a restricting wall of the lens holder 3, and a rolling ball will be described in detail with reference to FIG. 5 to FIG. 7. Since structures of parts of the three sets are the same, one among them will be exemplified and description of other parts will be omitted. FIG. 5 is a schematic diagram of a cross-sectional structure showing enlarged parts of the ball receiving surface part 1b, the abutting wall 1c, the ball receiving surface part 3b, and the restricting wall 3c in FIG. 4, and shows a reference state in which the lens holder 3 is at the initial position. FIG. 6 is a schematic diagram of a cross-sectional structure showing a state in which the lens holder 3 in FIG. 5 is moved from the initial position to an end to which it can move. FIG. 7 is a schematic diagram of a cross-sectional structure showing a state in which a gap between a restricting wall and an abutting wall is a maximum.

The lens holder 3 can be moved from the initial position within a range of −S to +S in the first and second directions with respect to the base member 1. As shown in FIG. 5, the lens holder 3 has a concave first ball restricting part, and the convex ball receiving surface part 1b provided in the base member 1 enters the concave part. At the initial position of the lens holder 3, the first abutting wall 1c of the base member 1 is in a positional relationship in which it is separated from the first restricting wall 3c of the lens holder 3 by a predetermined distance (denoted as B). That is, the lens holder 3 cannot move further than the distance B from the initial position with respect to the base member 1. The lens holder 3 is designed so that it can move within a range of −S to +S from the initial position, and B and S satisfy the following relational formula (1).

$$B \geq S \qquad \text{(Formula 1)}$$

On the other hand, when B>S is set, a restricting member for setting a movable range of the lens holder 3 to ±S is separately provided. During usual movement of the lens holder 3 without applying an external force such as an impact, the first abutting wall 1c and the first restricting wall 3c do not come into contact with each other. In addition, when an inadvertent force such as an impact force is applied to the lens holder 3 and thus a force rotating the base member 1 around an axis parallel to the optical axis is applied, the first abutting wall 1c and the first restricting wall 3c are brought into contact with each other so that the lens holder 3 does not move more than necessary.

FIG. 6 shows a state in which the lens holder 3 moves by S in a right direction from the initial position in a general use state. This is a state in which, when the lens holder 3 has moved from the reference state in FIG. 5, the first abutting wall 1c is brought into contact with the first restricting wall 3c. When the lens holder 3 moves by S, a maximum gap (denoted as G) between the first abutting wall 1c and the first restricting wall 3c is represented by the following Formula (2).

$$G = B + S \qquad \text{(Formula 2)}$$

A case in which a value of the maximum gap G is larger than the diameter of the rolling ball 5a is assumed. In this case, when an impact force or the like applied in the state in FIG. 6 and the rolling ball 5a moves, the rolling ball 5a may fall from the ball receiving surface part 1b and additionally fall off from the inside of the concave part. When the rolling ball 5a has somewhat fallen off of the ball receiving surface part 1b, since the rolling ball 5a is pushed back according to the centering operation of the image blur correction device 30, it can be returned onto the ball receiving surface part 1b. However, in the state shown in FIG. 7, it is difficult to return the rolling ball 5a. FIG. 7 shows a state in which an angle formed between a contact position between the rolling ball 5a and a contact surface (ball receiving surface) and a surface that is parallel to the ball receiving surface part 1b through the center of the rolling ball 5a is 45 degrees. When the angle is 45 degrees or less, even if the centering operation is performed, it is difficult to return the rolling ball 5a onto the ball receiving surface part 1b. Therefore, when an upper limit value of the maximum gap G is denoted as Gmax and the diameter of the rolling ball is denoted as D, they are set to satisfy the following relational formula in the state in FIG. 7.

$$G \leq \frac{D(2+\sqrt{2})}{4} \qquad \text{Formula 3}$$

The right side of the inequality indicates the upper limit value Gmax. The following formulas are established from above (Formula 1), (Formula 2), and (Formula 3).

$$S + S \leq B + S \leq \frac{D(2+\sqrt{2})}{4}$$

that is, $$S \leq \frac{D(2+\sqrt{2})}{8} \qquad \text{Formula 4}$$

According to this setting, it is possible to prevent falling off when an impact force or the like is applied and the rolling member has moved, and returning according to the centering operation is possible.

Figure 8:
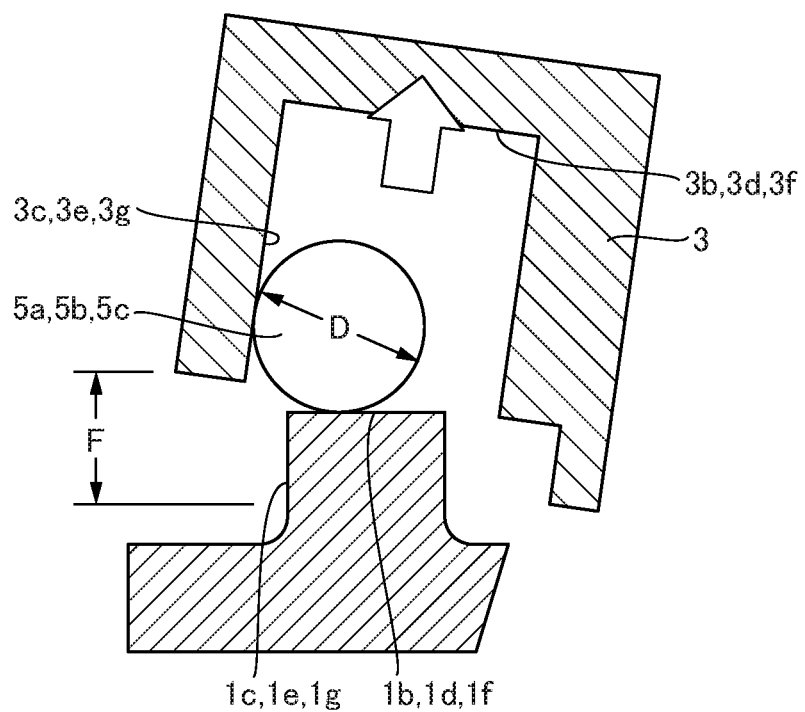
FIG. 8 is a diagram illustrating a state in which the lens holder is lifted with respect to a base member.
Figure 9:
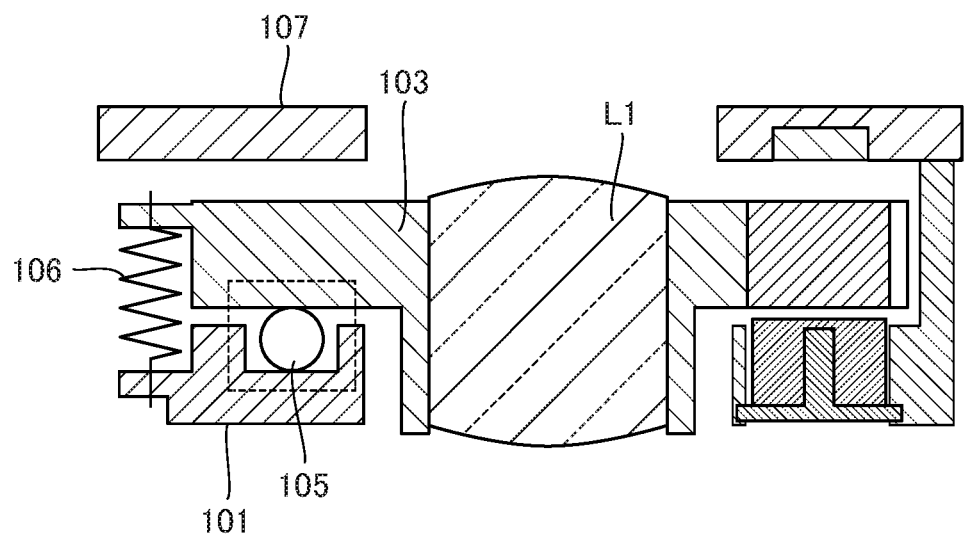
FIG. 9 is a schematic diagram illustrating a main part of an image blur correction device of a comparative example.
Figure 10:
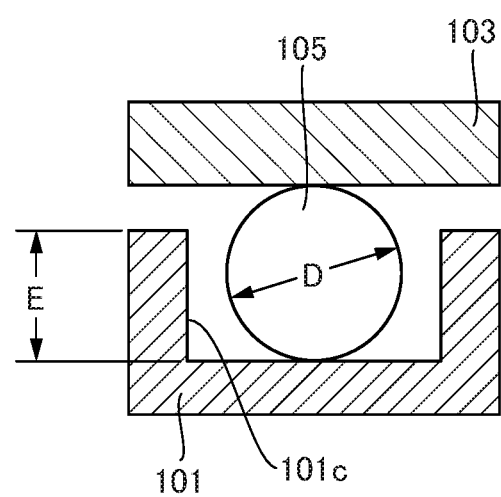
FIG. 10 is an enlarged view illustrating a rolling ball in FIG. 9 and parts in the vicinity thereof.
Figure 11:
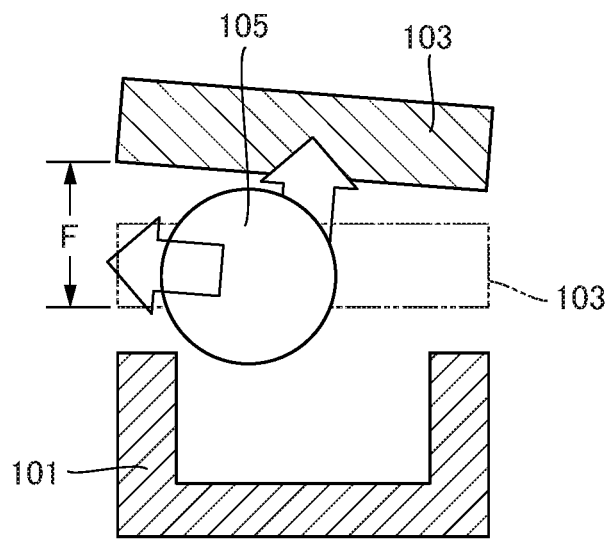
FIG. 11 is a diagram illustrating a state in which a lens holder in FIG. 9 is lifted with respect to a base member.

Next, the reason why the length of the restricting walls 3c, 3e, and 3g of the lens holder 3 is set to be larger than a ball diameter D, and a position of the biasing member will be described in detail with reference to FIG. 5 and FIG. 8 to FIG. 11. FIG. 8 is a schematic diagram showing a state in which the lens holder 3 is lifted by a distance F due to an external force. FIG. 9 to FIG. 11 are schematic diagrams of a cross-sectional structure showing a comparative example. FIG. 9 is a diagram showing an image blur correction device of the comparative example. FIG. 10 is a diagram showing only a rolling ball 105 in a lens holder 103 in FIG. 9 and parts in the vicinity thereof. FIG. 11 is a diagram showing a state in which an external force is applied to the lens holder 103 shown in FIG. 10 and the lens holder 103 is lifted by the distance F.

In the present embodiment, as shown in FIG. 5, the ball receiving surface part 1b of the base member 1 enters the restricting wall 3c. When the depth of the restricting wall 3c, that is, a distance from an opening surface of the concave part to the ball receiving surface part 3b, is denoted as C, the relationship of "C>D" is satisfied and C is deeper than the diameter D of the rolling ball.

On the other hand, in the image blur correction device of the comparative example shown in FIG. 10, the rolling ball 105 is received in a concave part having a U-shaped cross section, and the depth of a restricting wall 101c of a base member 101 is denoted as E. The relationship of "E<D" is satisfied and E is smaller than the diameter D of the rolling ball 105. A case in which a strong external force such as an impact is applied to such an image blur correction device, parts are inadvertently deformed, and a force pulling the base member 101 and the lens holder 103 apart is applied is assumed. As shown in FIG. 11, when the lens holder 103 is lifted by the distance F, the rolling ball 105 may come out of the concave part. When the rolling ball 105 has come out of the concave part once, it is almost impossible to return it back to the inside of the concave part, and an image blur correction function may be interfered with. In order to reduce the size, if the diameter D of the rolling ball 105 is reduced and the length E of the restricting wall 101c is shortened, there is a high likelihood of the rolling ball 105 jumping out.

On the other hand, in the present embodiment, as shown in FIG. 8, there is a low likelihood of the rolling ball 5a jumping out even in a state in which the lens holder 3 is lifted by the same distance F. That is, as can be seen from a positional relationship between the rolling ball 5a shown in FIG. 8, and the restricting wall 3c and the ball receiving surface part 1b, in this state, a likelihood of the rolling ball 5a jumping out from the concave part is sufficiently low. Therefore, it is possible to ensure the image blur correction function against an external force in contrast to the comparative example.

In the present embodiment, as shown in FIG. 4, when viewed in the optical axis direction, the biasing spring 6a is disposed at a position overlapping the ball receiving surface part 3b. In order to prevent the rolling ball from jumping out, it is effective to directly bias a place in which the rolling ball is disposed by the biasing member. That is, it is possible to reduce an amount of the lens holder 3 lifted by an external force in the vicinity of the rolling ball as much as possible. In the image blur correction device of the related art, a tension spring (FIG. 9: 106) is used as a biasing member in many cases. However, in the present embodiment, a compression spring is used and effectively biases the lens holder 3.

In addition, when the abutting wall 1c (1e, 1g) of the base member 1 is brought into contact with the restricting wall 3c (3e, 3g) of the lens holder 3, a range of movement of the lens holder 3 is restricted. Since this eliminates the need to provide a member for restricting movement of the lens holder 3 in a separate place, there are advantages of increasing the space efficiency and not increasing in the number of parts. In addition, the configuration of the present embodiment in which direct restriction is performed near the rolling ball has a role of preventing the rolling ball from jumping out more effectively. Here, the abutting wall 1c (1e, 1g) and the restricting wall 3c (3e, 3g) may be used to restrict movement of the lens holder 3 in a general use state. Alternatively, a functional form in which the parts do not come in contact with each other in a general use state, and the parts come in contact with each other to restrict movement of the lens holder 3 only when a large external force such as an impact is applied may be used. However, in the latter case, there is a need to provide a member for restricting a range of movement of the lens holder 3 in a general use state in a separate place.

The present embodiment is effective in further improving impact resistance performance and realizing a reduction in size in the image blur correction device having a configuration using a rolling member having favorable drive performance. In addition, when the biasing member is disposed at a place overlapping a movable range of the rolling member when viewed in the optical axis direction, it is possible to reduce a likelihood of the rolling member falling off due to an inadvertent force such as an impact force.

Second Embodiment

Figure 12:
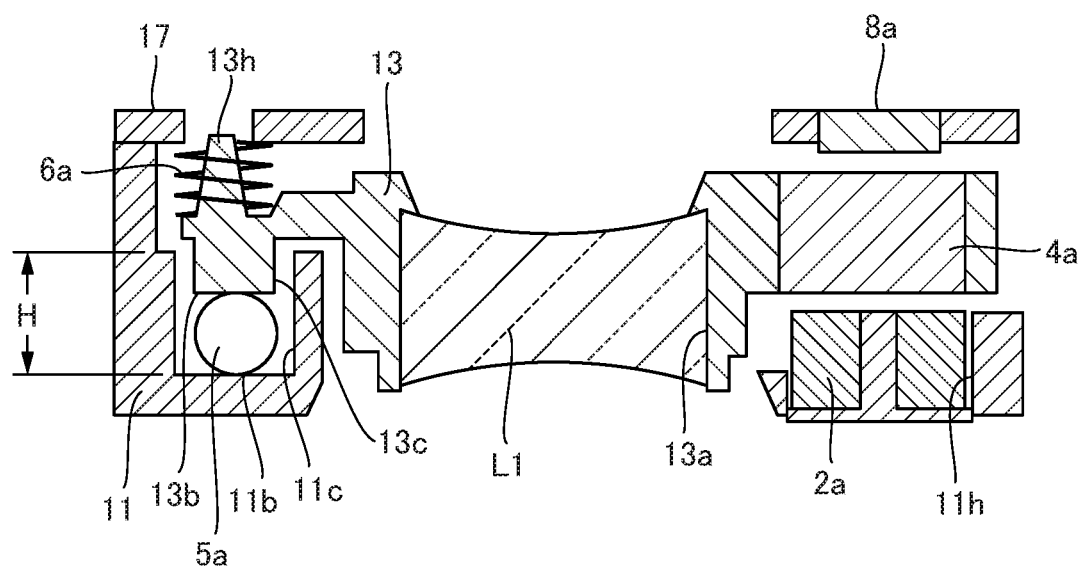
FIG. 12 is a schematic diagram illustrating a cross-sectional structure showing a main part of an image blur correction device of a second embodiment.

A second embodiment will be described with reference to FIG. 12. Differences between the present embodiment and the first embodiment will be described and details of parts the same as in the first embodiment will not be described. In addition, parts corresponding to constituent components described in the first embodiment will be denoted with reference numerals obtained by adding 10 to the reference numbers already used. FIG. 12 is a schematic diagram of the same cross-sectional structure as in FIG. 4. A difference between the present embodiment and the first embodiment is that a relationship between the convex ball receiving part of the base member 1 and the concave ball restricting part of the lens holder 3 is reversed. That is, the present embodiment has a configuration in which a concave ball restricting part is provided in a base member 11 shown in FIG. 12 and a convex ball receiving part is provided in a lens holder 13.

The lens holder 13 that holds the correction lens L1 is supported on the base member 11 by three rolling balls. While the rolling ball 5a is shown in FIG. 12, the other rolling balls have the same configuration. The base member 11 has a concave ball restricting part composed of a ball receiving surface part 11b for the rolling ball 5a and a restricting wall 11c which is an outer wall thereof. The rolling ball 5a is in the concave part of the ball restricting part and rolls on the ball receiving surface part 11b. In the structure, when the length (height) of the restricting wall 11c is denoted as H, a relationship of "H>D" is satisfied, H is longer than the diameter D of the rolling ball, and the rolling ball 5a is unlikely to fall off.

The lens holder 13 has a convex ball receiving part composed of a ball receiving surface part 13b of the rolling ball 5a and an abutting wall 13c which is an outer peripheral wall thereof. The ball receiving part is inserted into the ball restricting part (concave part) of the base member 11. The lens holder 13 is held movably with respect to the base member 11 via the rolling ball 5a. In addition, when viewed in the optical axis direction, the biasing spring 6a is disposed at a position overlapping the ball receiving surface part 13b and is held by a spring holding part 13h on the side opposite to the ball receiving surface part 13b.

In the present embodiment, a depth H of the concave ball restricting part is set to be larger than the ball diameter D. The depth H can be secured irrespective of the size of the ball diameter D, and even when an external force such as an impact force is received and a force pulling the base member 11 and the lens holder 13 apart is applied, it is possible to reduce a likelihood of the rolling ball coming out from the ball restricting part (concave part). In addition, in the present embodiment, when the concave ball restricting part is provided in the base member 11, it is possible to improve assemblability.

The present invention is not limited to the above embodiment, and various alternations and modifications can be made, and these are also included in the technical scope of the present invention. For example, an example in which a relationship between the ball restricting part and the ball receiving part is the same for the rolling balls 5a, 5b, and 5c has been described in the above embodiment. The present invention is not limited thereto and support structures of the first embodiment and the second embodiment may be used in combination. For example, an embodiment in which a ball restricting part is provided on the side of the base member for the rolling balls 5a and 5b and a ball restricting part is provided on the side of the lens holder for the rolling ball 5c may be used. In addition, the present invention is not limited to an example of an image blur correction device configured to move an optical member (such as a correction lens and a prism) and it can be applied to an image blur correction device configured to move an imaging element. In addition, the present invention is not limited to a configuration in which a correction lens or an imaging element is moved within a plane perpendicular to an optical axis, and it can be applied to an image blur correction device configured to move a correction lens or an imaging element along a predetermined curved surface or spherical surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-197015, filed Oct. 10, 2017 which is hereby incorporated by reference wherein in its entirety.

What is claimed is:

1. An image blur correction device comprising:
   a base member;
   a movable member which holds one of an optical member and an imaging element;
   a rolling member supporting the movable member, the rolling member capable of relative movement to the base member and configured to correct image blur by moving the movable member;
   a concave restricting part provided in one of the base member and the movable member, the concave restricting part restricting movement of the rolling member; and
   a convex receiving part provided in one of the movable member and the base member, the convex receiving part receiving the rolling member,
   wherein the rolling member is disposed in the concave restricting part, the concave restricting part sandwiching the rolling member together with a receiving surface of the convex receiving part, the rolling member being disposed in a concave part of the concave restricting part that is deeper than the diameter of the rolling member and the receiving surface of the convex receiving part being located in the concave part, and
   wherein the rolling member is capable of relative movement to the convex receiving part in the same direction as relative movement of the movable member to the base member.

2. The image blur correction device according to claim 1,
   wherein the concave restricting part includes a receiving surface and a restricting wall for the rolling member,
   wherein the convex receiving part includes an abutting wall for the rolling member, and
   wherein, when the restricting wall and the abutting wall are brought into contact with each other, movement of the movable member to the base member is restricted.

3. The image blur correction device according to claim 1, wherein, when an amount of movement of the movable member from an initial position is set as S and the diameter of the rolling member is set as D, the following relationship is satisfied:

$$S \leq \frac{D(2+\sqrt{2})}{8}.$$

4. The image blur correction device according to claim 2, wherein the image blur correction device includes the optical member, the optical member having an optical axis direction, and
   wherein the image blur correction device further comprises a biasing member that biases at least one of receiving surface of the concave restricting part and the receiving surface of the convex receiving part the optical axis direction of the optical member.

5. The image blur correction device according to claim 4, wherein the biasing member is disposed at a position overlapping the concave restricting part or the convex receiving part when viewed in the optical axis direction.

6. The image blur correction device according to claim 4, wherein the biasing member is a compression spring.

7. An imaging device comprising:
   a base member;
   a movable member which holds one of an optical member and an imaging element;
   a rolling member supporting the movable member, the rolling member capable of relative movement to the base member and configured to correct image blur by moving the movable member;
   a concave restricting part provided in one of the base member and the movable member, the concave restricting part restricting movement of the rolling member; and
   a convex receiving part provided in one of the movable member and the base member, the convex receiving part receiving the rolling member,
   wherein the rolling member is disposed in the concave restricting part, the concave restricting part sandwiching the rolling member together with a receiving surface of the convex receiving part, the rolling member being disposed in a concave part deeper than the diameter of the rolling member, and the receiving surface of the convex receiving part being located in the concave part, and wherein the rolling member is capable of relative movement to the convex receiving part in the same direction as relative movement of the movable member to the base member.

8. The imaging device according to claim 7,
wherein the concave restricting part includes a receiving surface and a restricting wall for the rolling member,
wherein the convex receiving part includes abutting wall for the rolling member, and
wherein, when the restricting wall and the abutting wall are brought into contact with each other, movement of the movable member to the base member is restricted.

9. The imaging device according to claim 7, wherein, when an amount of movement of the movable member from an initial position is set as S and the diameter of the rolling member is set as D, the following relationship is satisfied:

$$S \leq \frac{D(2+\sqrt{2})}{8}.$$

10. The imaging device according to claim 9, wherein the imaging device includes the optical member, the optical member having an optical axis direction, and
wherein the imaging device further comprises a biasing member that biases at least one of receiving surface of the concave restricting part and the receiving surface of the convex receiving part the optical axis direction of the optical member.

11. The imaging device according to claim 10, wherein the biasing member is disposed at a position overlapping the concave restricting part or the convex receiving part when viewed in the optical axis direction.

12. The imaging device according to claim 10, wherein the biasing member is a compression spring.

13. An optical device comprising:
a base member;
a movable member which holds one of an optical member and an imaging element;
a rolling member supporting the movable member, the rolling member capable of relative movement to the base member and configured to correct image blur by moving the movable member;
a concave restricting part provided in one of the base member and the movable member, the concave restricting part restricting movement of the rolling member; and
a convex receiving part provided in one of the movable member and the base member, the convex receiving part receiving the rolling member,
wherein the rolling member is disposed in the concave restricting part, the concave restricting part sandwiching the rolling member together with a receiving surface of the convex receiving part, the rolling member being disposed in a concave part of the concave restricting part that is deeper than the diameter of the rolling member and the receiving surface of the convex receiving part being located in the concave part, and
wherein the rolling member is capable of relative movement to the convex receiving part in the same direction as relative movement of the movable member to the base member.

14. The optical device according to claim 13,
wherein the concave restricting part includes a receiving surface and a restricting wall for the rolling member,
wherein the convex receiving part includes an abutting wall for the rolling member, and
wherein, when the restricting wall and the abutting wall are brought into contact with each other, movement of the movable member to the base member is restricted.

15. The optical device according to claim 13, wherein, when an amount of movement of the movable member from an initial position is set as S and the diameter of the rolling member is set as D, the following relationship is satisfied:

$$S \leq \frac{D(2+\sqrt{2})}{8}.$$

16. The optical device according to claim 15, wherein the optical device includes the optical member, the optical member having an optical axis direction, and
wherein the optical device further comprises a biasing member that biases at least one of receiving surface of the concave restricting part and the receiving surface of the convex receiving part the optical axis direction of the optical member.

17. The optical device according to claim 16, wherein the biasing member is disposed at a position overlapping the concave restricting part or the convex receiving part when viewed in the optical axis direction.

18. The optical device according to claim 16, wherein the biasing member is a compression spring.

* * * * *